(12) United States Patent
Collins

(10) Patent No.: US 6,352,224 B1
(45) Date of Patent: Mar. 5, 2002

(54) STATIONARY CLAMPING DEVICE FOR FLEXIBLE CONDUIT

(75) Inventor: John D. Collins, Sturgeon Bay, WI (US)

(73) Assignee: C&S Manufacturing Corporation, Sturgeon Bay, WI (US)

( * ) Notice: Subject to any disclaimer, the term of this patent is extended or adjusted under 35 U.S.C. 154(b) by 0 days.

(21) Appl. No.: 09/887,830

(22) Filed: Jun. 22, 2001

(51) Int. Cl.[7] .................................................. F16L 3/02
(52) U.S. Cl. .......................... 248/73; 248/65; 248/74.1
(58) Field of Search ........................... D8/356; 248/49, 248/56, 65, 71, 72, 73, 75, 74.1, 74.2

(56) References Cited

U.S. PATENT DOCUMENTS

| 2,058,752 A | 10/1936 | Wray ........................... 248/65 |
| 2,294,483 A | * 9/1942 | Smith ........................... 248/56 |
| 2,458,670 A | * 1/1949 | Young, Jr. .................... 248/56 |
| 3,853,148 A | 12/1974 | De Vincent et al. ........ 138/110 |
| 4,795,114 A | 1/1989 | Usui et al. ..................... 248/62 |
| 4,858,861 A | 8/1989 | Wilkinson, III ............ 248/74.1 |
| 4,886,228 A | 12/1989 | Kennedy .................... 248/74.1 |
| 4,909,462 A | 3/1990 | Usui ........................... 248/74.1 |
| 5,078,346 A | 1/1992 | Deichman ................... 248/351 |
| 5,209,439 A | 5/1993 | Coll ............................ 248/65 |
| D346,546 S | 5/1994 | Tesmar, Jr. .................. D8/356 |

\* cited by examiner

Primary Examiner—Anita King
Assistant Examiner—Jon Szumny
(74) Attorney, Agent, or Firm—Ryan Kromholz & Manion, S.C.

(57) ABSTRACT

A stationary support member providing a close bend to support a flexible conduit, such as plastic or metal tubing, and to rigidly mount the conduit on a support structure.

8 Claims, 3 Drawing Sheets

STATIONARY CLAMPING DEVICE FOR FLEXIBLE CONDUIT

BACKGROUND OF THE INVENTION

The present invention relates generally to mounting brackets for flexible conduits and, more particularly, to such brackets configured for use in mounting flexible conduits to fixed panels or other supporting structure.

During the past several years there has been increased use of flexible tubing, commonly known as PEX® tubing that is being used by many plumbers in running water lines versus the-age old copper tubing product.

Prior art clamping structures suffer from the disadvantage that the flexibility of the conduit itself and the manufacturing tolerances between the conduit position and the position of the supporting structure tend to require significant manipulation of the conduit with respect to the bracket for affecting installation, particularly when the tubular conduit requires a close bend, such as a 90° bend or a U-bend. This is often the case during sinuous installation of tubing used in radiant heating, as the tubing is stretched from end to end of a room.

SUMMARY OF THE INVENTION

An object of the present invention is to provide a new, simple and efficient bracket or stationary support member for securing flexible tubular members to supporting structures.

A further object of the invention is to provide brackets of such character that they can be used to support tubular members having bends of varying size and shape ordinarily required.

A still further object of the invention is to provide brackets of such character that tubular conduit members can be secured thereto readily, but which are maintained in place after installation.

In accordance with the present invention the brackets may be made of a suitable stamped metallic material and of such construction as to have a substantially elongated, arcuate, continuous channel for supporting the flexible conduit. The channel generally includes an intermediate portion, a proximal end portion and a distal end portion, each portion being defined by first and second continuous sidewall members for sidewise support of the conduit. One of the sidewalls includes an outer defining margin configured to follow the arcuate contour of the channel. The second oppositely disposed sidewall has an undulating marginal contour defining and intermediate crested area which extends upwardly above the outer arcuate margin of the first sidewall to provide additional sideways support of the flexible conduit. The proximal end portion of the bracket is formed with a configuration that conforms to a semi-circular configuration of an opening in an affixed mounting plate. The mounting plate includes an inwardly extending semi-circular flanged portion preferably including peripheral notches to permit the flange to be crimped towards the proximal end portion of the bracket for temporary support during a spot welding or other permanent means for holding the bracket in direct connection with the mounting plate.

The mounting plate of this invention has been improved to provide a notched out area extending from the flanged portion of the mounting plate to allow a plumber, or other installer, to facilely insert the bracket at any position along the tubing line. That is, the entire unit has been specifically designed to provide ease in mounting of either a straight or bent portion of the flexible tubing. Further, the mounting plate of this invention includes a general "L"-shaped embossment for added strength and rigidity when being positioned on a supporting structure. A multiplicity of apertures are provided in the marginal edge of the mounting plate for receipt of fasteners, such as nails, screws, or the like.

SUMMARY OF THE INVENTION

The stationary clamping device of this invention is readily adaptable for fastening to a basal surface flexible tubular articles, such as plastic tubing used in the plumbing trades, and more recently, for transporting heating water or other fluid in radiant heating installations. More particularly, this invention relates to improvement in devices for fastening such tubular articles to stationary supporting structures wherein the aforementioned tubing or conduit emerges from an opening in the stationary supporting structure and then being bent to accommodate surrounding circumstances, such as closely positioned studs, joists or other beam-like supports that might interfere with an installation of the flexible tubing.

Heretofore, stationary clamping devices, clips or other bracket-like structures have utilized supporting members that entirely surround the tubing or which provide clamping surfaces that may interfere and abrade the outer surfaces of the flexible tubing or conduit. It will also be appreciated that such devices have been difficult to install, particularly in relatively "tight" installations.

The present invention provides a clamping device which includes two cooperating elements, namely a sheet-like mounting plate and a supporting bracket member extending from and supported by the mounting plate. The mounting plate includes a plurality of apertures for receiving fasteners, such as nails or screws. The mounting plate further includes a notched-out area with a configuration defined by angularly disposed marginal edges which converge inwardly towards one another and terminate in a semi-circular inwardly extending flanged area. The flanged area is arranged to extend into the aforementioned opening in the supporting structure. The mounting plate further includes an embossment which is preferably of "L"-shape and which extends inwardly to provide lateral strength in the main supporting directions. The bracket member for supporting the tubular conduit is also preferably stamped from sheet-like material and includes a continuous arcuate channel for supporting the flexible conduit. The channel is further formed to provide general angular configuration for extending the tubular conduit outwardly from the mounting plate to directly support the conduit in spaced relationship from the mounting plate and its supporting structure. In particular, the arcuate channel of the bracket member includes oppositely positioned sidewalls for sidewise support of the flexible conduit. The sidewalls and channel defines a proximal end portion, an intermediate portion and a distal end portion for removable support of the conduit. That is, the intermediate portion of the bracket member has one sidewall extending upwardly from the channel surface to provide a crest-like margin extending above the outer margin of the opposite sidewall in an undulating fashion to taper downwardly towards opposed end portions, and wherein the distal end portion is provided with an enlarged marginal area which has been formed to bend inwardly to thereby provide a partial enclosure for grasping and retaining the conduit and thereby minimize adventitious movement of the conduit with respect to the bracket member. At the proximal end of the bracket member, the first-mentioned sidewall is tapered towards the mounting bracket to provide a semi-circular formation mating with the inwardly extending semi-circular flange and be fastened thereto by spot welding or other securement means.

Thus, the clamping device permits a very convenient support means for a tubular member which may be bent to conform to the contour of the channel portion of the bracket member and which tubular member may be retained by the distal end portion and proximal end portion by a snapping action without need for threaded screw-type clamps or the like. The nipping or snapping action may be done with one hand and a natural elasticity of the flexible conduit will act to be retained in place.

DESCRIPTION OF THE DRAWINGS

These and other objects and features will become apparent to those skilled in the plumbing installation and other conduit installation arts upon reading the following description and with reference to the accompanying drawings in which.

DETAILED DESCRIPTION

Figure 1:
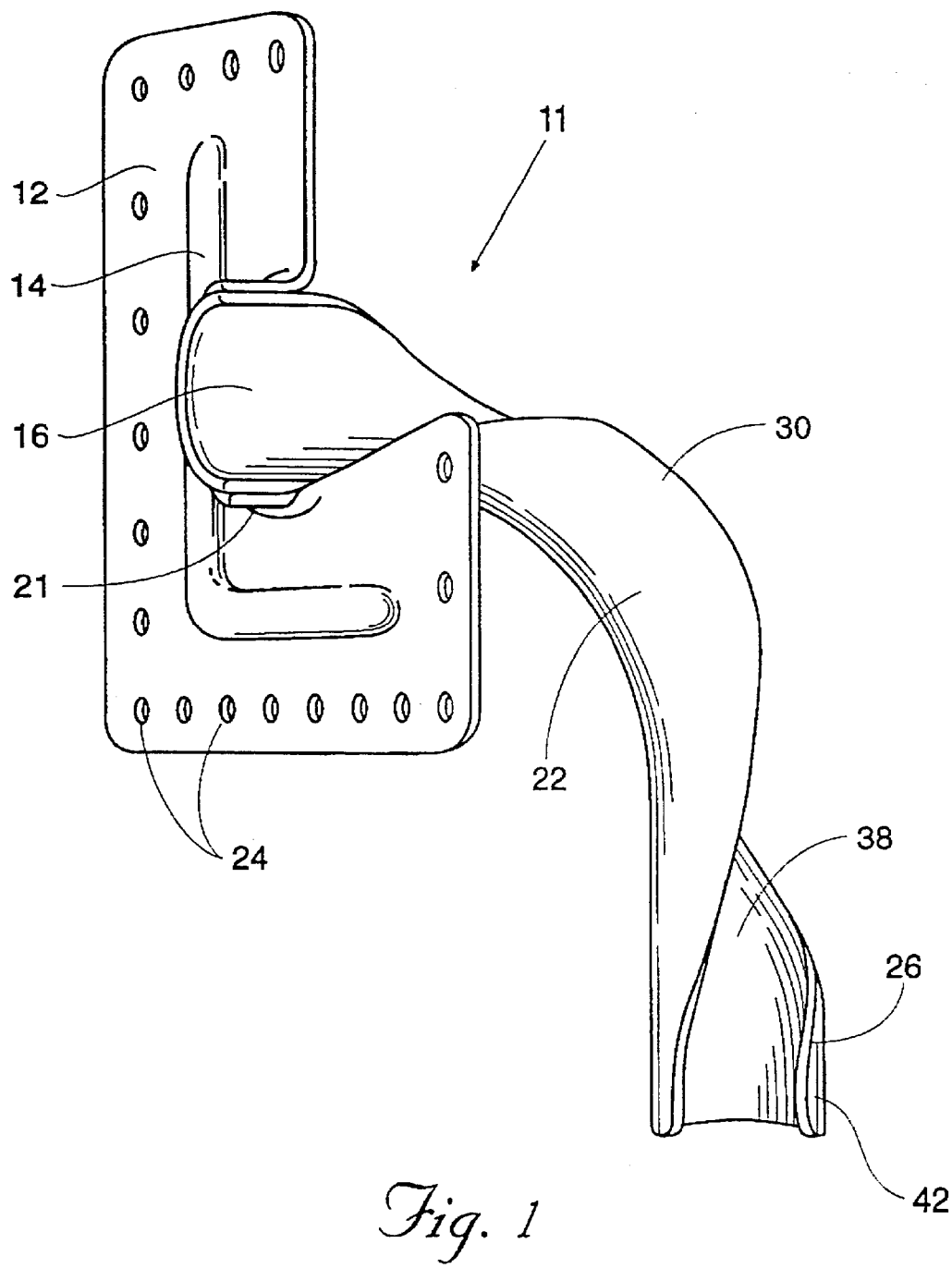
FIG. 1 is a perspective view of a clamping device for supporting flexible conduit.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

FIGS. 1 through 7 illustrate a preferred embodiment of the present invention as applied to a flexible tubular conduit.

In the various drawing figures it will be noted that the clamping device, denoted generally by the reference numeral 11, includes a mounting plate 12 which may be stamped from sheet-like material to include a generally "L"-shaped embossment 14 projecting inwardly of the plate 12. The mounting plate 12 further includes a generally semi-circular opening 16 defined by an inwardly-extending flange 18. The flange 18 preferably includes a plurality of peripherally spaced notches 20 defining crimping portions 21.

The notched flange 18 provides a means of crimping the mounting plate to the supporting bracket member 22. The plate 12 and bracket member 22 may be further secured together by means of spot welding, adhesive bonding in the case of devices formed from plastic materials, or similar securing means for attaching adjoining members.

Although it is preferred to use metallic stampings to provide the clamping device 11, it is within the province of this invention to utilize molded members of resinous plastic material.

The mounting plate 12 further includes a plurality of openings or apertures 24 for mounting the plate 12 and bracket 22 to a stationary supporting structure (not shown) with the use of conventional nails and/or screws (not shown).

Figure 2:
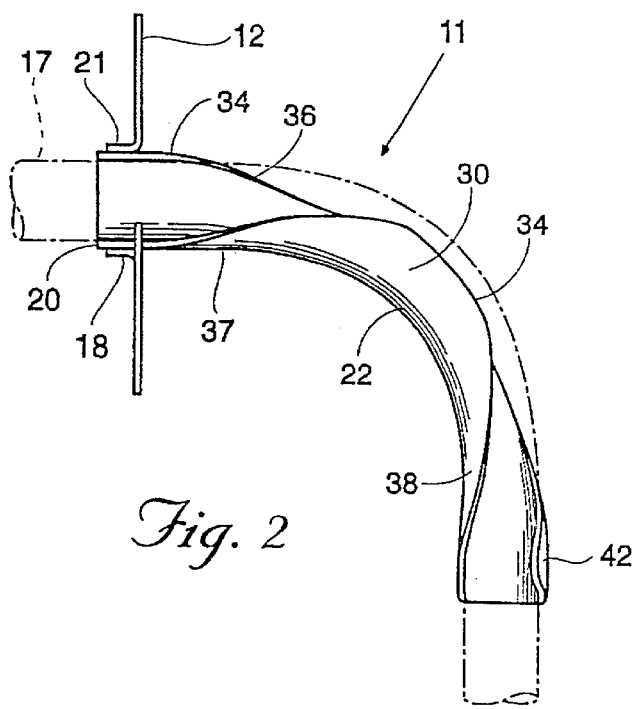
FIG. 2 is a right side elevational view thereof, and including a fragmentary portion of a flexible conduit supported thereby.
Figure 3:
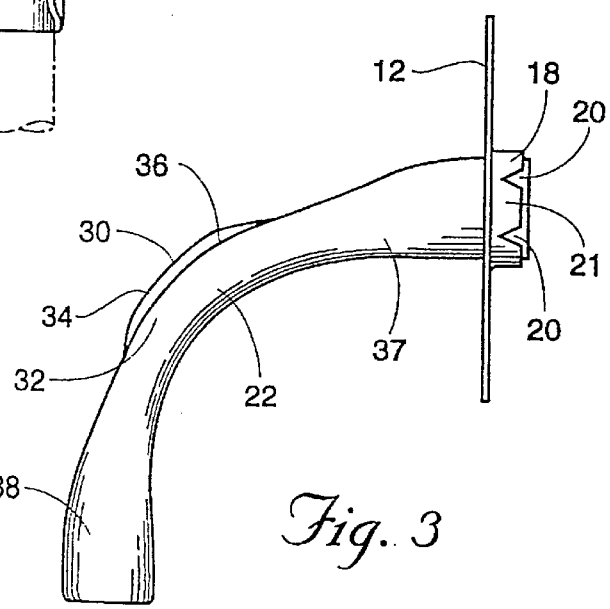
FIG. 3 is a left side elevational view thereof.
Figure 4:
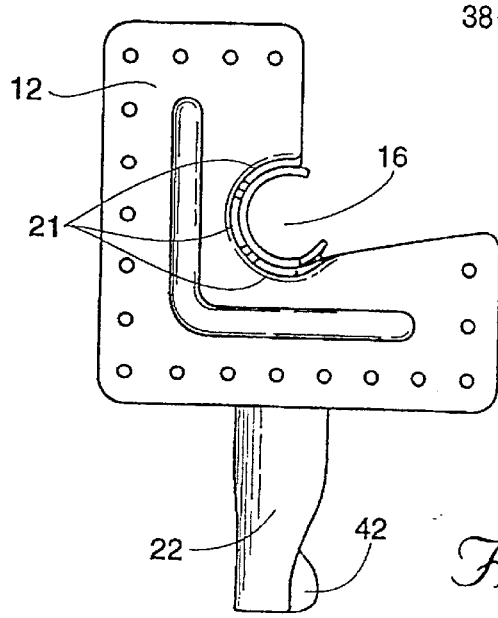
FIG. 4 is a rear elevational view thereof.

As will be observed from FIG. 2, the clamping device 11 has particular application for supporting tubing 17 which emerges from an opening in or adjacent to a mounting structure. Retention of the flexible conduit 17 (shown in phantom in FIG. 2) in the clamping device 11 permits the tubing to be held in spaced relationship with the mounting plate 12 as it emerges from the distal end portion 26 of the bracket 22.

Figure 6:
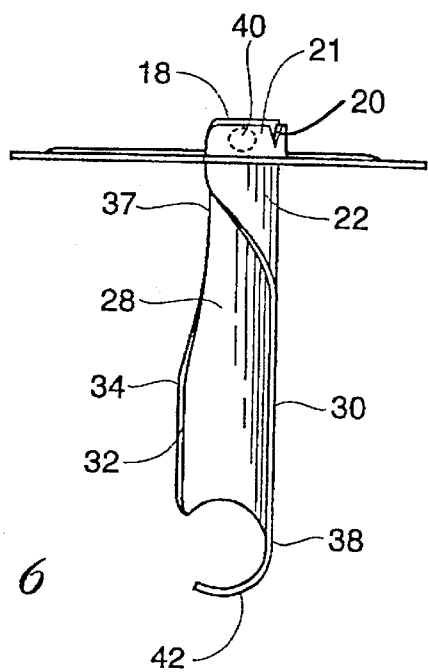
FIG. 6 is a top plan view thereof.

As stated previously, the bracket 22 is preferably formed from a stamping of a single piece of sheet metal to provide a continuous arcuate channel 28 (see FIG. 6). The channel 28 includes oppositely disposed sidewalls 30 and 32. As will be readily apparent from FIG. 3, the sidewall 30 has a crested intermediate portion 34 which extends above the margin 36 defining the sidewall 32 and tapers downwardly at both its proximal end portion 37 and its distal end portion 38.

Figure 7:
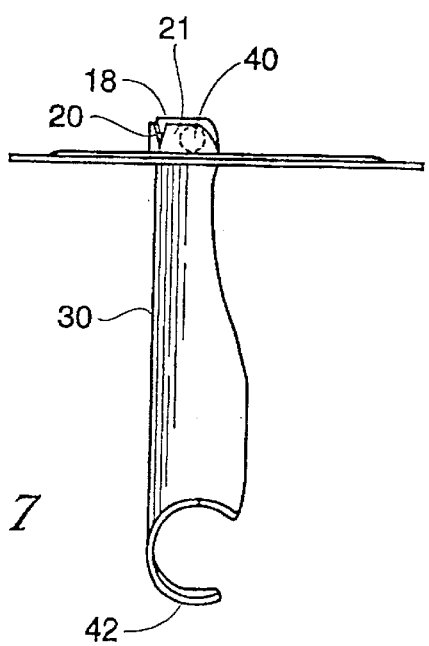
FIG. 7 is a bottom plan view thereof.

As will be noted from FIG. 7, the inwardly projecting flange 18 of the mounting plate 12 includes a spot weldment 40. The flange portions defined by the notches 20 are capable of being crimped to provide an initial attachment to the bracket 22 for purposes of stabilizing the bracket 22 and mounting plate 12 during spot welding operation.

Figure 5:
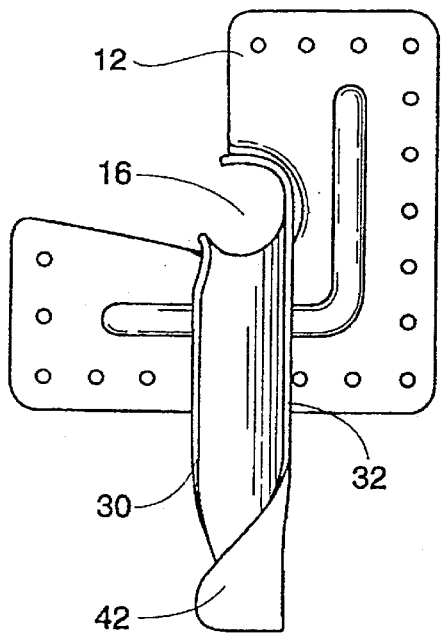
FIG. 5 is a front elevational view thereof.

With reference to FIGS. 2 and 5, it will be noted that the sidewalls 30, 32 both taper at their ends, with the proximal end 37 being formed of a size that will be grasped by the crimping portions 21 of the flange 18, whereas the distal end 38 of the bracket 22 is provided with a reverse bend or flap 42 to partially surround the tubing 17, as shown in FIG. 2. This bend or flap 42 provides additional support for minimizing adventitious movement of the flexible conduit 17 with respect to the bracket 22, and with particular reference to the distal end 36 thereof.

It will be apparent from the foregoing description, with reference to the drawings, there had been presented a novel clamping device for attaching a flexible conduit to a supporting structure. The device may be facilely manufactured from readily available flat stock, and of such a device that will permit ease in access of a flexible conduit to a novel formed bracket. The two main elements 12 and 22 of the clamping device 11, may be readily joined together by usual and conventional means such as spot welding or, if of molded plastic, readily obtained adhesive material fabricated to provide adequate strength between joined members.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A stationary clamping device for attaching a flexible conduit to a supporting structure, said clamping device comprising:

a sheet-like mounting plate for securing said device to said supporting structure, the mounting plate including a notched area configured to include defining angularly disposed marginal edges converging inwardly and terminating in an inwardly flanged opening, and a bracket member extending laterally outwardly from said mounting plate, said bracket member being formed from sheet-like material and including an elongate, continuous, arcuate channel for supporting said flexible conduit, said channel including oppositely disposed first and second substantially coextensive sidewalls for sidewise support of said conduit, said bracket member and bracket member channel including a proximal end portion, an intermediate portion and a distal end portion, said first sidewall having an outer marginal edge configured to follow the arcuate contour of said channel, the second sidewall having an undulating marginal contour defining an intermediate crested area extending above the marginal edge of said first sidewall to provide additional sidewise support of said flexible conduit, the proximal end portion of said bracket member being tapered towards and crimpingly secured to the inwardly flanged opening in said mounting plate, and the distal end portion of said channel having its first sidewall being further formed to laterally extend from said channel to form a reverse bend contoured inwardly to provide a partial enclosure for grasping and retaining said conduit and thereby minimize adventitious movement of said flexible conduit with respect to said bracket member.

2. The stationary clamping device of claim 1, wherein said mounting plate includes an inwardly extending embossment configured to provide additional lateral strength to said mounting plate.

3. The stationary clamping device of claim 2, wherein said embossment is provided with an L-shaped configuration.

4. The stationary clamping device of claim 1, wherein the inwardly flanged opening in said mounting plate includes peripherally spaced notches defining peripherally spaced crimping areas for crimped retention of said bracket.

5. The stationary clamping device of claim 4, wherein at least one of the peripherally spaced crimping areas is welded to said bracket member.

6. The stationary clamping device of claim 1, wherein the inwardly flanged area of said mounting plates is of semicircular contour to receive and retain the proximal end portion of said bracket member.

7. The stationary clamping device of claim 1, wherein said mounting plate is metallic and is stamped, pierced and formed from sheet metal.

8. The stationary clamping device of claim 1, wherein the distal end portion of the bracket member is spaced from the mounting plate and is formed to face in a parallel direction with the plane of said sheet-like mounting plate.

* * * * *